J. Woolf,
Mechanical Movement.
N° 53,914. Patented Apr. 10, 1866.
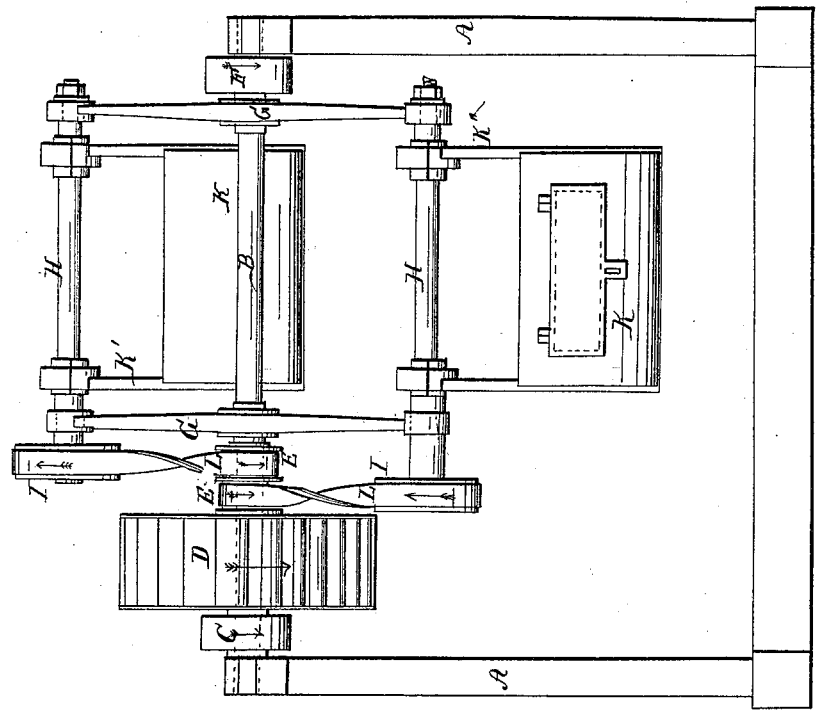
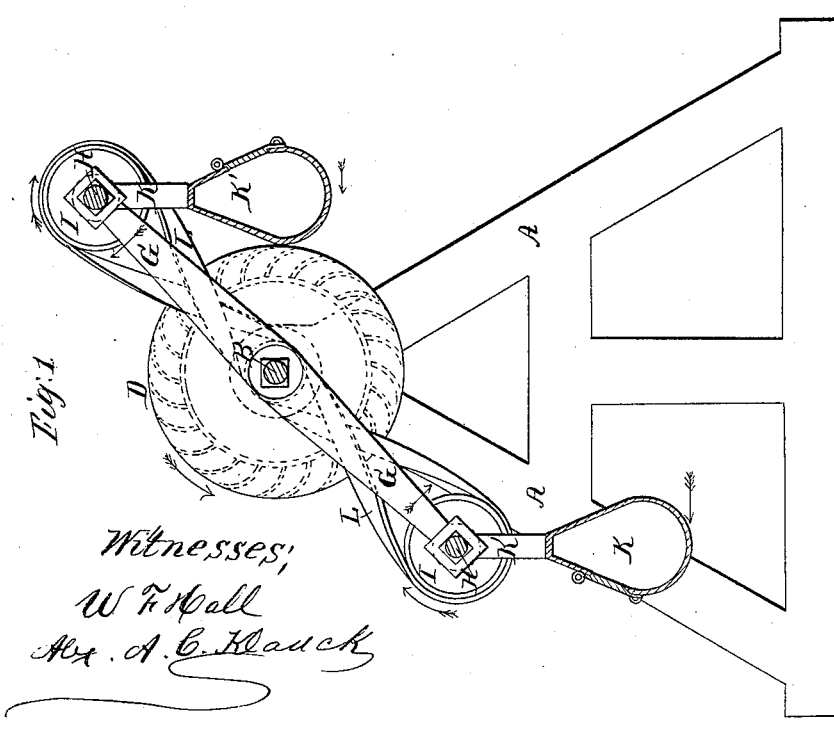
Witnesses:
W. F. Hall
Alx. A. C. Klauck
Inventor:
Jacob Woolf

UNITED STATES PATENT OFFICE.

JACOB WOOLF, OF BURR OAK, MICHIGAN.

IMPROVEMENT IN TRANSMITTING POWER.

Specification forming part of Letters Patent No. 53,914, dated April 10, 1866.

*To all whom it may concern:*

Be it known that I, JACOB WOOLF, of Burr Oak, in the county of St. Joseph and State of Michigan, have invented certain new and useful Improvements in Machinery for the Transmission of Power Developed in Horse-Power Apparatus, or in Steam, Water, or Air Engines; and I do hereby declare the following to be a full, clear, and exact description thereof, reference being had to the annexed drawings, making part of this specification, in which—

Figure 1 is a vertical transverse section, and Fig. 2 an elevation, of my invention.

The nature of my invention consists in so constructing a machine to be used as an intermediate auxiliary between the first motor and the result, whether the motor be steam, air, water, or any other power, as that the machine materially aids in the production of such results and serves to counterbalance loss of power by friction and other causes.

A A is a gallows-frame supporting the bearings of shaft B. On one end of this shaft, and fitting loosely, so as to turn freely upon it, is a pulley, C, or a toothed wheel, to which motion may be given from any source; or there may be a water-wheel, as shown at D, to which water-power may be applied directly. Either device will be securely attached to two or more small pulleys, E E, in such a manner that all can revolve together on the shaft B, on the other end of which is secured a fast pulley, F, from which a belt may extend to the work to be finally performed.

On the shaft B, and securely fixed so as to revolve with it, are two arms, G G. At their extremities, and turning freely in bearings therein, are the shafts H H, each having a fixed pulley, I I, on the end nearest to the pulley C and E E.

The weight-boxes K K, which may be of any desired form and dimensions, are secured by their arms I' I' rigidly upon the shafts H H, so that the shafts cannot turn in their bearings at the ends of the arms G G without moving the boxes K. These boxes are to be loaded through doors in their sides, so that they shall be equal in weight, and this may be fixed at any amount, being dependent altogether upon the work to be performed.

When power is applied to the pulley C, or to its equivalent, or to a water-wheel arranged as described, the pulleys E E, which are also made to revolve, at the same time give motion by their belts L L to the pulleys I I, (the direction of the motion is indicated by arrows,) causing the weight-boxes K to be swung upon their bearings at the ends of the arms G G, so that one shall be thrown to a greater distance from the axis of the shaft B than when it was at rest, and the other drawn in to the same degree nearer the axis of B, thus causing the shaft B, with its fixed pulley F, to revolve by a preponderance of weight, which shall be constantly thrown out of balance on one side of the shaft B.

Having thus fully described my invention, what I claim as new herein, and desire to secure by Letters Patent, is—

The shaft B, the arms G G, with the shafts H H, and their weight-boxes K K, arranged substantially as described, and operating either by pulleys E E and I I and belts or by toothed gearing, or by any device to accomplish the same end, so as to cause the weights K, or their equivalents, to be thrown out of balance in such a manner that one shall be constantly farther from the axis of the shaft B than the other, and thereby aid it in its revolution, as and for the purpose set forth.

JACOB WOOLF.

Witnesses:
W. F. HALL,
ALEX. A. C. KLAUCKE.